July 16, 1929.  W. H. DUGGAN  1,720,947
BATTERY CONTAINER AND HANDLE
Filed Aug. 22, 1927
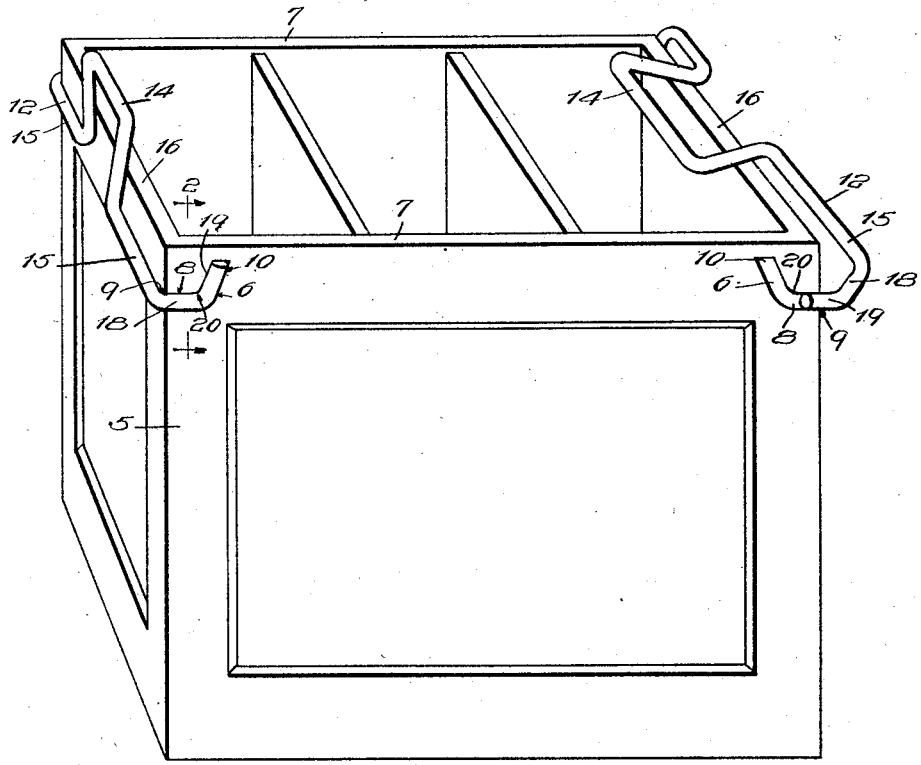
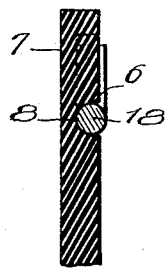
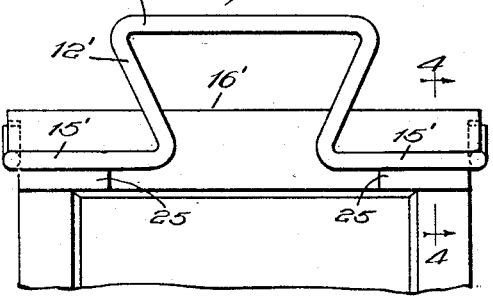
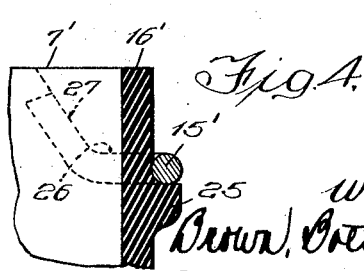
Witness:
William P. Kilroy
Inventor:
William H. Duggan
By Brown, Critchlow & Gienner
Attys Patented July 16, 1929.

1,720,947

UNITED STATES PATENT OFFICE.

WILLIAM H. DUGGAN, OF CHICAGO, ILLINOIS, ASSIGNOR, BY MESNE ASSIGNMENTS, OF FOUR-TENTHS TO BENJAMIN CLARKE, ONE-TENTH TO C. W. CLARKE, AND ONE-TENTH TO FRANK M. CLARKE, ALL OF CHICAGO, ILLINOIS.

BATTERY CONTAINER AND HANDLE.

Application filed August 22, 1927. Serial No. 214,555.

This invention relates to container and handle means for storage batteries and the like and its objects are the provision of a generally improved and simplified container and handle that may be economically produced.

The invention provides a container and handle combination in which the handle is adapted for ready attachment and which is, in use, held firmly in place and in proper operative position.

The handle is, where desired, adapted for use with the usual or any suitable hold-down, well known in the art, for holding the battery down through the handle.

The invention is illustrated in the accompanying drawing in which:—

Fig. 1 is a perspective view of a container and handle means embodying the present invention;

Fig. 2 is a fragmentary vertical detail section taken on the line 22 of Fig. 1;

Fig. 3 is a fragmentary end view of another embodiment of the invention; and

Fig. 4 is a fragmentary vertical detail section taken on the line 4—4 of Fig. 3.

Referring to the drawing, the container indicated generally in 5 has a pair of grooves 6 in the outer surfaces of each of its side walls. The grooves 6 are disposed at the ends of the container and each groove has a substantially horizontal portion 8, opening at 9 from the end of the container. The opposite ends of the horizontal portion 8 of each groove 6 opens into a deflected groove portion, which is preferably upturned as indicated at 10. The upper or opposite ends of the up-turned portions 10, may be closed by the material of the container wall although this may, of course, be varied.

The handle means comprises a pair of handles 12 each of which may be formed of a rod of circular cross section or of other suitable stock, as desired. Each handle 12 has a bight or handle loop 14 positioned when operatively attached to the container as shown to the left in Fig. 1 and adapted to be grasped to lift the container. The handle portion 15 which extends along the end walls 16 of the container terminates in end portions 18 turned in along the side walls 7 of the container to engage in the grooves 6 and these in-turned end portions have deflected or up-turned ends 19 adapted to be engaged in the deflected groove portions 10.

The in-turned portions 18 with the deflected ends 19 form hooks at the opposite ends of each handle and these hook and the handles are formed relative to the shoulders formed by the grooves in the walls of the container so that the handle may be positioned as indicated at the right in Fig. 1, engaging the ends 19 in the grooves in the walls of the container and then by turning or rocking the handle into the position as indicated at the left in Fig. 1 the hooked ends of the handle are hooked into the grooves, or into engagement with the walls or shoulders formed by the grooves.

The grooves are preferably slightly out of round, as indicated at 20 and the hooked ends of the handles are preferably slightly out of round so that in turning or rocking the hooked ends of the handle into place the ends of the hooks are placed under a slight strain prior to reaching the ultimate or operative position and this is somewhat relieved as the hook reaches the ultimate position indicated at the left in Fig. 1. The result or effect is that the handle is thereby yieldingly locked in its upright or operative position. This is desirable in that the handle is often utilized in connection with a hold-down for the box, as well understood in the art and this prevents the handle from accidentally swinging down where it might contact the conductors and short circuit portions of the battery.

In the embodiment of Figs. 3 and 4 the end walls 16' are provided with shoulders 25 which engage beneath the handle portions 15' limiting the downward movement of these portions and where a hold-down is employed with the handle effectively bracing the portions 15' and loop or bight 14'.

Where the shoulders 25 are provided on the end walls of the container the bottoms or lower portions of the grooves may be omitted and the side walls 7' of the containers simply provided with the downwardly and inwardly directed shoulder portions 26 and 26, respectively, although, of course, the complete grooves may be employed in this case as in the preceding embodiment.

I claim:

1. In combination a container having shoulder means thereon, a handle for said container and means on said handle engageable with the shoulder means on the container by rocking movement of the handle with respect to the container, said shoulder means being disposed adjacent the top and at the end of the container and permitting the handle to be tilted up over the top of the container in engaging the handle with and disengaging same from said shoulder means.

2. In combination, a container having shoulder means thereon, a handle for said container and a hook on said handle and engageable with the shoulder means on the container by rocking movement of the handle with respect to the container, said shoulder means being disposed adjacent the top and at the end of the container and permitting the handle to be tilted up over the top of the container in engaging the handle with and disengaging same from said shoulder means.

3. In combination, a container having a handle receiving shoulder thereon; and a handle having a hook interlocking with the shoulder and adapted to hook into interlocking engagement with the shoulder through a swinging of the handle, said hook being sprung by the shoulder as it is swung to place and yieldingly holding the handle in its normal position, said shoulder means being disposed adjacent the top and at the end of the container and permitting the handle to be tilted up over the top of the container in engaging the handle with and disengaging same from said shoulder means.

4. In combination, a container having handle receiving shoulders thereon; and a handle having hooks interlocking with the shoulders and adapted to hook into interlocking engagement with the shoulders through a swinging of the handle, said shoulder means being disposed adjacent the top and at the end of the container and permitting the handle to be tilted up over the top of the container in engaging the handle with and disengaging same from said shoulder means.

5. In combination a container having handle receiving shoulders thereon; and a handle having hooks interlocking with the shoulders and adapted to hook into interlocking engagement with the shoulders through a swinging of the handle, said hooks being sprung by the shoulders as they are swung to place and yieldingly holding the handle in its normal position, said shoulder means being disposed adjacent the top and at the end of the container and permitting the handle to be tilted up over the top of the container in engaging the handle with and disengaging same from said shoulder means.

6. In combination, a container having handle receiving shoulders on the side walls thereof; and a handle having hooks interlocking with the shoulders and adapted to hook into interlocking engagement with the shoulders through a swinging of the handle, said shoulder means being disposed adjacent the top and at the end of the container and permitting the handle to be tilted up over the top of the container in engaging the handle with and disengaging same from said shoulder means.

7. In combination, a container having handle receiving shoulders on the side walls thereof; and a handle having hooks interlocking with the shoulders and adapted to hook into interlocking engagement with the shoulders through a swinging of the handle, said hooks being sprung by the shoulders as they are swung to place and yieldingly holding the handle in its normal position, said shoulder means being disposed adjacent the top and at the end of the container and permitting the handle to be tilted over the top of the container in engaging the handle with and disengaging same from said shoulder means.

8. In combination, a container having handle receiving shoulders thereon; and a handle having hooks formed with horizontal portions and up-turned ends interlocking with the shoulders and adapted to hook into interlocking engagement with the shoulders through a swinging action of the handle, said shoulder means being disposed adjacent the top and at the end of the container and permitting the handle to be tilted over the top of the container in engaging the handle with and disengaging same from said shoulder means.

9. In combination, a container having handle receiving grooves thereon forming upwardly and downwardly faced shoulders; and a handle having hooks adapted to be hooked into the grooves by a swinging action of the handle, said grooves being formed in the sides of the container at the top and opening from one end of the container and said handle being engageable with and disengageable from said grooves in tilted position over the top of one end of the container.

10. In combination, a container having handle receiving grooves thereon forming upwardly and downwardly faced shoulders; and a handle having hooks adapted to be hooked into the grooves by a swinging action of the handle, said grooves and hooks being formed to spring the hooks in an intermediate position of the hooks and to yieldingly hold the handle in normal position, said grooves being formed in the sides of the container at the top and opening from one end of the container and said handle being engageable with and disengageable from said grooves in tilted position over the top of one end of the container.

11. In combination, a container having a pair of handle receiving grooves one in each of its opposite side walls, said grooves being disposed at the top of the container and at one end with one end of each groove opening from the end of the container and the grooves arched upwardly from said opening ends, and a handle having upwardly hooked portions at its opposite ends adapted to be hooked into said grooves solely by a swinging action of the handle, a bight in said handle between said upwardly hooked ends, said bight being formed to draw said hooked ends into said grooves by a downward force on said handle and said handle being engageable and disengageable from said grooves, with said bight in tilted position over the top of the end of the container.

12. In combination, a container having a pair of handle receiving grooves one in each of its opposite side walls, said grooves being disposed at the top of the container and at one end with one end of each groove opening from the end of the container and the grooves arched upwardly from said opening ends, and a handle having upwardly hooked portions at its opposite ends adapted to be hooked into said grooves solely by a swinging action of the handle, a bight in said handle between said upwardly hooked ends, and said upwardly hooked portions being formed to transmit downwardly directed hold-down stresses to the container without freeing or swinging the handle means relative to the container.

In witness whereof, I hereunto subscribe my name this 17th day of August, 1927.

WILLIAM H. DUGGAN.